(12) United States Patent
Maruyama et al.

(10) Patent No.: US 7,114,901 B2
(45) Date of Patent: Oct. 3, 2006

(54) FASTENER FOR USE WITH SHEET-SHAPED MEMBER AND ASSEMBLY USING THE FASTENER

(75) Inventors: Toshio Maruyama, Toyohashi (JP); Masaaki Yamagata, Okayama (JP)

(73) Assignee: Newfrey, LLC, Newark, DE (US)

( * ) Notice: Subject to any disclaimer, the term of this patent is extended or adjusted under 35 U.S.C. 154(b) by 0 days.

(21) Appl. No.: 10/728,908

(22) Filed: Dec. 8, 2003

(65) Prior Publication Data
US 2004/0141829 A1    Jul. 22, 2004

(30) Foreign Application Priority Data
Dec. 17, 2002    (JP)    ............... 2002-365373

(51) Int. Cl.
*F16B 21/18*    (2006.01)
*F16B 37/16*    (2006.01)

(52) U.S. Cl. .................. 411/353; 411/437; 411/107; 411/546; 411/999; 24/293

(58) Field of Classification Search .............. 411/352, 411/353, 107, 970, 999, 546, 437; 24/293, 24/297
See application file for complete search history.

(56) References Cited

U.S. PATENT DOCUMENTS

| | | | |
|---|---|---|---|
| 1,373,645 A | | 4/1921 | Bandoly |
| 3,515,418 A | * | 6/1970 | Baugh ..................... 403/408.1 |
| 4,435,111 A | * | 3/1984 | Mizusawa ................... 411/437 |
| 4,615,655 A | * | 10/1986 | Dixon ........................ 411/339 |
| 4,743,152 A | | 5/1988 | Nakayama et al. |
| 4,828,444 A | * | 5/1989 | Oshida ....................... 411/437 |
| 4,927,306 A | | 5/1990 | Sato |
| 4,978,265 A | | 12/1990 | De Wan |
| 5,098,242 A | | 3/1992 | Schaty |
| 5,291,639 A | | 3/1994 | Baum et al. |
| 5,302,070 A | | 4/1994 | Kameyama et al. ........ 411/437 |
| 5,328,311 A | * | 7/1994 | Knohl ......................... 411/353 |
| 5,551,817 A | | 9/1996 | Kanie ......................... 411/107 |
| 5,707,192 A | * | 1/1998 | Vortriede et al. ........... 411/175 |
| 5,807,052 A | * | 9/1998 | Van Boven et al. ........ 411/353 |
| 6,174,118 B1 | * | 1/2001 | Rebers et al. ........... 411/107 X |
| 6,582,171 B1 | * | 6/2003 | Bondarowicz et al. .. 411/999 X |
| 6,623,226 B1 | * | 9/2003 | Braun et al. ............ 411/970 X |
| 6,769,851 B1 | * | 8/2004 | Agha et al. ................. 411/353 |

FOREIGN PATENT DOCUMENTS

| | | |
|---|---|---|
| DE | 14 75 035 | 4/1969 |
| DE | 199 04 534 | 8/2000 |
| EP | 0 470 696 | 2/1992 |
| EP | 0 590 993 A1 | 4/1994 |
| JP | 8-54010 | 2/1996 |
| JP | 8-159118 | 6/1996 |

* cited by examiner

*Primary Examiner*—Katherine Mitchell
(74) *Attorney, Agent, or Firm*—Miles & Stockbridge P.C.

(57) ABSTRACT

A fastener, for use with a sheet-shaped member, comprises a tubular shank, a plurality of holding pieces extending outward from a first end of the shank, a flange extending outward from a second end of the shank, and a plurality of stud-engagement pawls extending into the interior of the shank. The shank has a length less than that of a stem of a stud fixed to a mounting member with which the fastener is to be engaged. When the stud is fully inserted into the tubular shank, the sheet-shaped member is fastened to the stud and the stud stem protrudes from a surface of the sheet-shaped member. The protruding portion of the stem allows an auxiliary member to be mounted thereto.

13 Claims, 8 Drawing Sheets

FASTENER FOR USE WITH SHEET-SHAPED MEMBER AND ASSEMBLY USING THE FASTENER

CROSS REFERENCE TO RELATED APPLICATION

This application claims the benefit of Japanese Patent Application No. 2002-365373 filed Dec. 17, 2002, incorporated herein by reference.

BACKGROUND OF THE INVENTION

The present invention relates, in part, to a fastener capable of fastening a sheet-shaped member, such as a noise-insulating member (e.g., silencer) for use in the cabin of an automobile, to a mounting member, such as a body panel of an automobile or an interior panel (e.g., a panel for the interior of an automobile), and serving as a spacer in mounting an auxiliary member, such as an air-conditioner component.

Fasteners for use in fastening a sheet-shaped member to a mounting member, such as a body panel of an automobile, are known. Such a fastener may be first attached to a mounting hole of the sheet-shaped member. Then, the fastener attached to the sheet-shaped member can be engaged with a stud fixed to the mounting member to fasten the sheet-shaped member to the mounting member. Such a fastener is disclosed, for example, in Japanese Patent Laid-Open Publication Nos. 8-54010 and 8-159118.

A fastener disclosed in Japanese Patent Laid-Open Publication No. 8-54010 includes a shank having a hook-shaped holding arm, wherein the shank is inserted into a mounting hole of a member while bending or folding the hook-shaped holding arm, and the hook-shaped holding arm is unfolded after passing through the mounting hole to allow the fastener to be attached to the member. While this fastener can be conveniently attached to the member by an operation only from one side of the member, the holding arm protrudes substantially from the member, and it is necessary to assure a space for receiving the holding arm, and to permit the holding function, which takes effect only after the holding arm is resiliently unfolded.

A fastener disclosed in Japanese Patent Laid-Open Publication No. 8-159118 is attached to a member by unfolding a pantograph-shaped head thereof. However, attaching this fastener to a member requires not only an insertion operation from one side of the member but also another operation from the opposite side thereof.

Conventional fasteners can be used to attach a sheet-shaped member to a mounting member, such as a body panel having a stud fixed thereto. However, most conventional fasteners are not constructed to allow an auxiliary member, such as an interior panel or air-conditioner component, to be mounted to the stud associated with the fastener. Moreover, conventional fasteners do not have a spacer function to prevent a sheet-shaped member from being flattened out, or to prevent a sheet-shaped member from adversely affecting positioning accuracy of an auxiliary member.

BRIEF DESCRIPTION OF THE INVENTION

In view of the above problems, it is an object of the present invention to provide an improved fastener capable of being readily attached to a sheet-shaped member by an operation from only one side of the sheet-shaped member.

It is another object of the present invention to provide a fastener capable of being attached to a sheet-shaped member with minimal protrusion from the sheet-shaped member.

It is still another object of the present invention to provide a fastener capable of serving as a spacer for mounting an auxiliary member, such as an interior panel or an air-conditioner component, relative to a mounting member.

It is yet another object of the present invention to provide a unique assembly of a mounting member, a sheet-shaped member, a fastener, and an auxiliary member.

In one of its embodiments, the present invention provides a fastener for use with a sheet-shaped member such as a silencer, wherein the fastener is adapted to be inserted into a mounting hole of the sheet-shaped member to hold the sheet-shaped member between first and second opposite surfaces thereof, so as to allow the sheet-shaped member to be fastened to a mounting member, such as a body panel, via the fastener.

According to a first aspect of the present invention, the fastener comprises: a tubular shank adapted to be inserted into the mounting hole of the sheet-shaped member; separate holding pieces for juxtaposition with a first surface of the sheet-shaped member, wherein each holding piece extends outward from a corresponding part of the periphery of a first end of the shank; a flange for juxtaposition with a second surface of the sheet-shaped member, wherein the flange extends radially outward from a second end of the shank, and has an outer cross-dimension greater than an inner cross-dimension of the mounting hole of the sheet-shaped member; and a plurality of stud-engagement pawls extending into the interior of the shank. In this fastener, the shank has a length less than that of a stem of a stud fixed to the mounting member, whereby the stud stem protrudes from the first surface of the sheet-shaped member after the fastener, insertably attached to the sheet-shaped member, is engaged with the stud, and wherein a protruding portion of the stem allows an auxiliary member to be mounted thereto.

The term "mounting member" herein means, e.g., a member, such as a body panel of an automobile, having a stud fixed thereon. The term "auxiliary member" herein means, e.g., a member to be additionally mounted to a stem of the stud after a sheet-shaped member is fastened to the mounting member via the fastener.

In the fastener set forth above, after the auxiliary member is mounted to the stud stem, the auxiliary member may be in contact with the holding piece to allow an end of the auxiliary member to be located at a position apart from the mounting member by a given distance.

BRIEF DESCRIPTION OF THE DRAWINGS

The invention will be further described in conjunction with the accompanying drawings, which illustrate preferred (best mode) embodiments, and wherein.

DETAILED DESCRIPTION OF THE INVENTION

A first embodiment of the present invention will now be described. In the description of this embodiment and the later description of a second embodiment, the terms "upper" and "lower" will be used with regard to the relationship of parts of the invention, but it is to be understood that these terms are used merely for convenience of description, and that the relationship of the parts can be changed to provide different orientations, so the terms "upper" and "lower" are not to be considered limiting.

Referring to FIGS. 1 to 4, the fastener 10 according to the first embodiment of the present invention is preferably an integrally molded product made of synthetic resin. The fastener 10 comprises a tubular shank 12, and preferably two pairs of opposed evenly-spaced holding pieces 13, each constituting an arm extending radially outward from a corresponding part of the periphery of a first end (upper end) of the shank 12. In the first embodiment, each of the holding pieces 13 preferably has a flat upper surface. In mounting an auxiliary member such as an interior panel, the upper surface of the holding pieces may be brought into contact with the auxiliary member. The number of the holding pieces (arms) is not limited to four, but may be more or less than four. In some cases a single arm may suffice.

As described in detail later, a silencer 7 (see FIGS. 7 and 8) is formed with a cylindrical mounting hole for receiving the fastener therein. While the distance between the outer ends of each of the two pairs of opposed holding pieces 13 is greater than the inner diameter of the mounting hole of the silencer 7, the silencer is made of a deformable material so that the holding pieces 13 can pass through the mounting hole of the silencer 7 while expandingly deforming the mounting hole, as later described.

The fastener 10 also includes a flange 14 extending radially outward from a second end (lower end) of the shank 12. The flange 14 may have a rectangular shape, for example. The distance between the opposed sides of the flange 14 is greater than the inner diameter of the mounting hole of the silencer 7, and, when the fastener is fully inserted into the mounting hole of the silencer 7, as later described, the flange 14 is brought into contact with the lower surface of the silencer 7. While the flange 14 in the first embodiment is formed in a rectangular shape, it may be formed in another shape, such as a circular shape.

Figure 1:
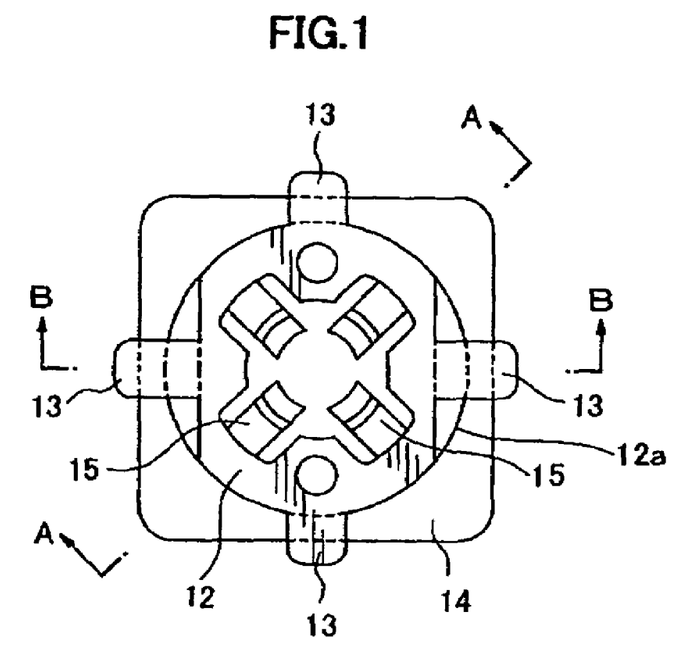
FIG. 1 is a top plan view of a fastener according to a first embodiment of the present invention.
Figure 2:
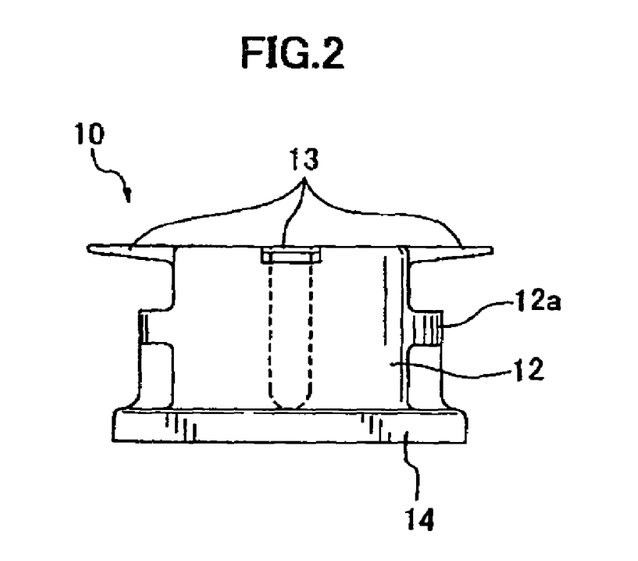
FIG. 2 is a front elevation view of the fastener according to the first embodiment
Figure 3:
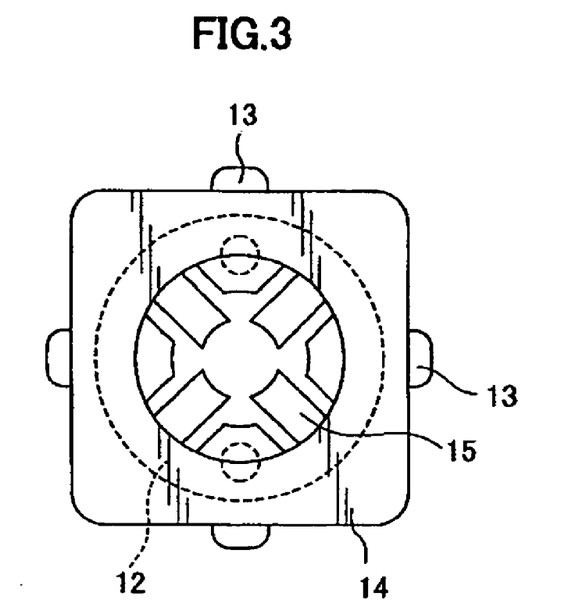
FIG. 3 is a bottom plan view of the fastener according to the first embodiment.
Figure 4:
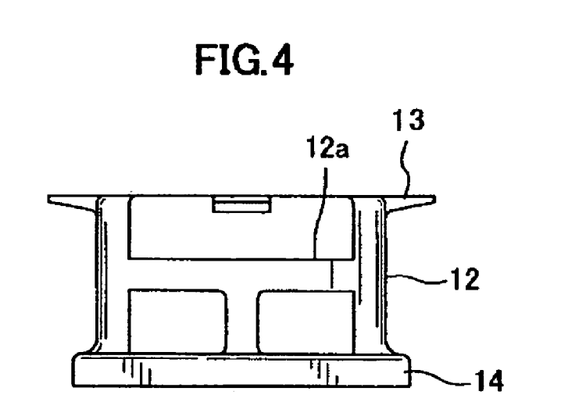
FIG. 4 is a side elevation view of the fastener according to the first embodiment.
Figure 5:
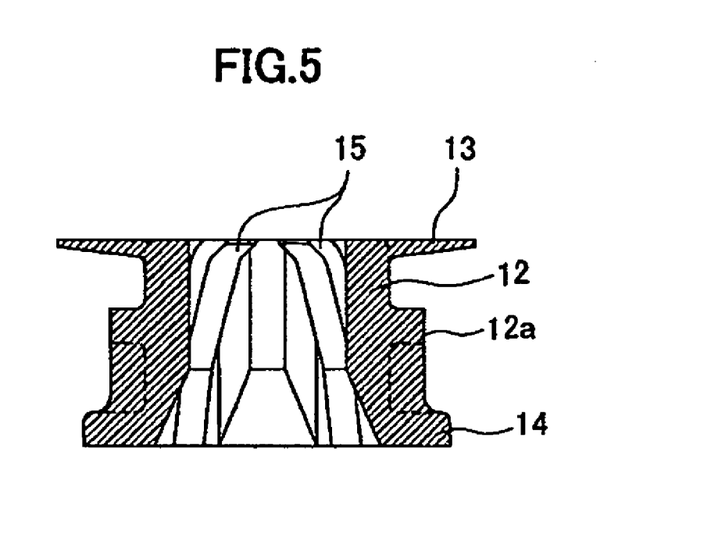
FIG. 5 is a sectional view taken along the line B—B in FIG. 1 showing the fastener according to the first embodiment.
Figure 6:
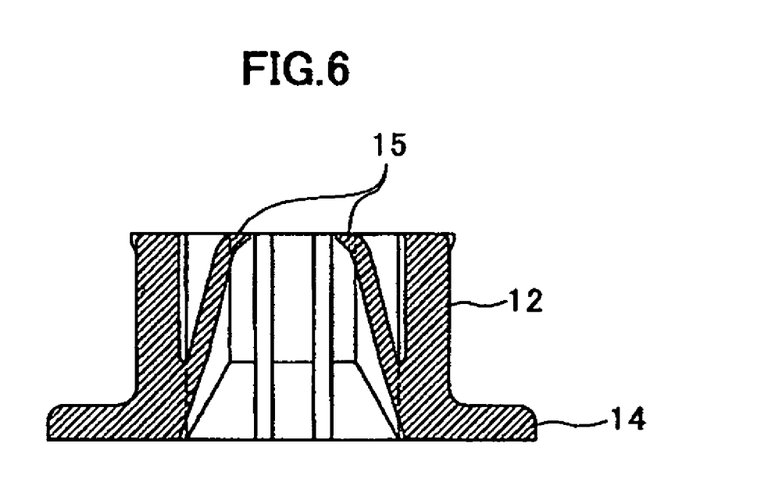
FIG. 6 is a sectional view taken along the line A—A in FIG. 1 showing the fastener according to the first embodiment.
Figure 7:
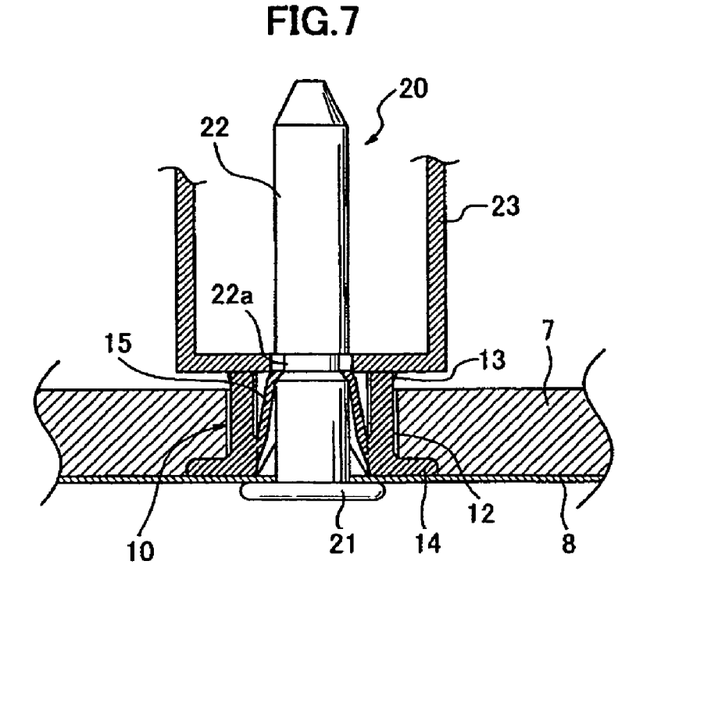
FIG. 7 is a sectional view showing the state after the fastener according to the first embodiment, pre-attached to a sheet-shaped member, is engaged with a stud fixed on a body panel and then an interior panel is mounted to the stud.
Figure 8:
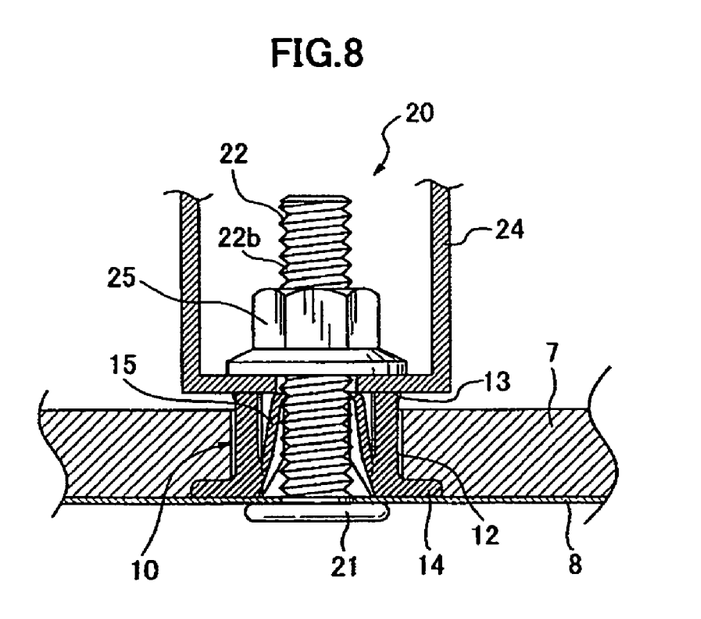
FIG. 8 is a sectional view showing the state after the fastener according to the first embodiment, pre-attached to a sheet-shaped member, is engaged with a stud fixed on a body panel and then an air-conditioner component is mounted to the stud.

Referring to FIGS. 5 and 6, the fastener 10 includes preferably four stud-engagement pawls 15 extending into the interior of the shank 12 from the second end of the shank. In this embodiment, each of the four stud-engagement pawls extends from the inner surface of the lower end of the shank 12 up to a position adjacent to the upper end of the shank while inclining inward. As seen in FIG. 1, each stud-engagement pawl 15 has an arc-shaped tip. The tips are engageable with a stem 22 of a stud 20, e.g. as shown in FIGS. 7 and 8, an M6 bolt with a diameter of 6 mm or an M8 pin bolt, as described in detail later. Each stud-engagement pawl 15 has a long length, and the tip of the stud-engagement pawl 15 can easily be moved outward when flexibly engaged with the stud stem 22 inserted into the lower end of the shank, or with various studs having different diameters. While the fastener in the first embodiment is provided with four of the stud-engagement pawls 15, the number of the stud-engagement pawls 15 is not limited to four. For example, it may be two, or even one.

The interior of the shank 12 of the fastener 10 is formed in a configuration capable of receiving therein a stud 20 fixed on a body panel 8 or other mounting member. The outline of the shank 12 in cross-section includes a pair of arcuate portions opposed to one another in a first direction and a pair of straight portions opposed to one another in a second direction perpendicular to the first direction. The outer surface of the shank 12 corresponding to the straight portions is partly formed with a pair of arcuate large-diameter portions 12a. Except for the region having the stud-engagement pawls 15, the shank 12 has an inner diameter greater than the diameter of the stem 22 of the stud 20 to allow the stem 22 to be readily inserted into the interior of the shank 12.

The shank 12 of the fastener 10 has a length less than that of the stem 22 of the stud 20. Thus, after the fastener is engaged with the stud, an auxiliary member can be mounted to the stud. As described in detail later, the stud 20 may include two types: one has a threaded stem and the other has a non-threaded stem. The shank 12 of the fastener 10 has sufficient wall thickness so that the shank is not deformed even if an auxiliary member is threadingly mounted to the stud with a nut, preventing the silencer 7 from being flattened out.

FIG. 7 is a sectional view showing the state after the fastener 10, pre-attached to the silencer 7, is engaged with the stud 20 fixed on the body panel 8 or other mounting member and then an auxiliary member such as an interior panel 23 is mounted to the stud 20. With reference to FIG. 7, an operation of attaching the fastener 10 to the silencer 7 will now be described. The fastener 10 is inserted into the mounting hole of the silencer 7 from the lower surface side of the silencer 7, with the holding pieces 13 at the leading end of the fastener 10. The holding pieces 13 pass through the mounting hole while expandingly deforming the mounting hole. Since the holding pieces 13 are provided only at four evenly spaced positions and the mounting hole is expandingly deformed only in four directions, the fastener can be readily inserted into the mounting hole.

When the holding pieces 13 fully pass through the mounting hole, the expandingly deformed mounting hole of the silencer 7 returns to its original shape to allow the lower surfaces of the holding pieces 13 to be brought into juxtaposition with the upper surface of the silencer 7. The flange 14 of the fastener may be pushed into the deformable material of the silencer 7.

In most conventional fasteners, a holding piece has been provided over the entire periphery of the upper end of the fastener, and the holding piece is essentially designed to have an outer diameter substantially greater than the diameter of a mounting hole of the silencer. When such a fastener is inserted through the mounting hole of the silencer, expandingly deforming the entire inner periphery of the mounting hole creates a difficult attaching operation. In contrast, separate holding pieces in the first embodiment of the present invention are preferably provided only at four evenly spaced positions on the periphery of the upper end of the fastener, instead of the entire periphery, and the fastener can be readily inserted into the mounting hole of the silencer. After the attaching operation of the fastener, the holding pieces can reliably hold the silencer without escaping through the mounting hole.

The stud 20 may be fixed on the body panel by welding or the like. In the form shown, stud 20 comprises a flange 21 in contact with the body panel 8, and a column-shaped stem 22. The stud stem 22 has a length greater than that of the shank 12 of the fastener 10. The tip of the stud stem 22 may have a tapered pin shape, for example.

After the fastener 10 is attached to the mounting hole of the silencer 7, the fastener 10 is aligned with the stud 20, and the silencer is pushed toward the body panel 8 to insert the stud 20 into the interior of the shank of the fastener. In this operation, the stud-engagement pawls 15 are moved outward by the stud stem 22. After the stud 20 shown in FIG. 7 is fully inserted into the fastener, the stud-engagement pawls 15 are engaged with a small-diameter portion 22a of the stud stem 22, so that the fastener 10 attached to the silencer 7 is attached to the stud 20. In this way, the silencer 7 can be pushed against and fastened to the body panel 8 by a one-touch operation on one side of the silencer.

In this state, the stem of the stud 20 protrudes from the upper surface of the silencer 7. In a subsequent operation, a mounting hole of the interior panel 23 is aligned with the stud 20, and the interior panel 23 is pushed toward the stud 20 until a lower wall of the interior panel 23 is brought into contact with upper surfaces of the shank 12 and holding pieces 13 of the fastener 10. In this way, the interior panel 23 is mounted to the stud 20 fixed on the body panel 8 or other mounting member.

After the interior panel 23 is mounted to the stud 20, the fastener 10 serves as a spacer. Specifically, the interior panel 23 is maintained at a position in contact with the upper surfaces of the shank 12 and holding pieces 13 of the fastener 10, to prevent the silencer 7 from being flattened out, and to prevent the silencer 7 from adversely affecting the positioning accuracy of the interior panel 23.

The structure in FIG. 8 is similar to that in FIG. 7, but differs therefrom in that a stud stem 22 in FIG. 8 is formed with external threads 22b along its length, instead of having the small-diameter portion 22a of the stud stem 22 in FIG. 7. Instead of the pin-type tip in FIG. 7, the stud 20 in FIG. 8 has a flat tip. After the stud 22 is fully inserted, the stud-engagement pawls 15 engage external threads 22b of the stud stem 22.

In FIG. 8, instead of the interior panel 23, an air-conditioner component 24 is fixedly mounted to the stud with a nut 25. The nut 25 is formed with internal threads engageable with the external threads 22b of the stud stem 22. Even if the nut 25 is tightly secured, the shank 12 of the fastener, having a sufficient thickness, can avoid deformation, preventing the silencer 7 from being flattened out, and preventing the silencer 7 from adversely affecting the positioning accuracy of the air-conditioner component 24.

FIGS. 9 to 14 show a fastener 10' according to a second embodiment of the present invention. In FIGS. 9 to 14, the same components or elements as those of the fastener 10 according to the first embodiment are designated by the same reference numerals, but primed.

Referring to FIGS. 9 to 14, the fastener 10' according to the second embodiment of the present invention comprises a tubular shank 12', four separate holding pieces 13', each extending radially outward from only a part of the periphery of a first end (upper end) of the shank 12', and a flange 14' extending radially outward from a second end (lower end) of the shank 12', as with the fastener 10 according to the first embodiment. The fastener 10' according to the second embodiment includes a plurality of stud-engagement pawls 15' extending inward from the first end (upper end) of the shank 12', perpendicular to the axis of the shank.

Figure 9:
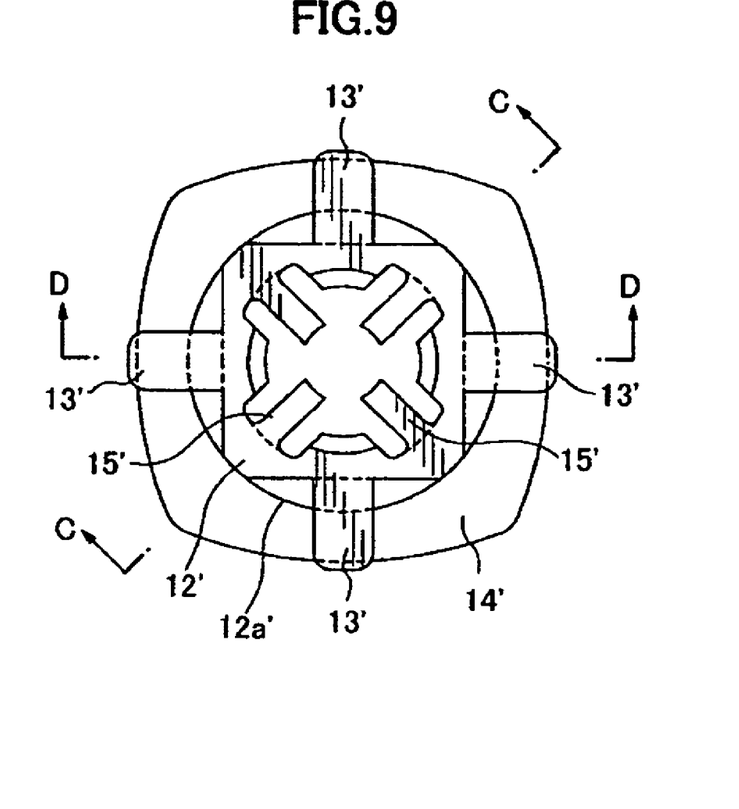
FIG. 9 is a top plan view of a fastener according to a second embodiment of the present invention.
Figure 10:
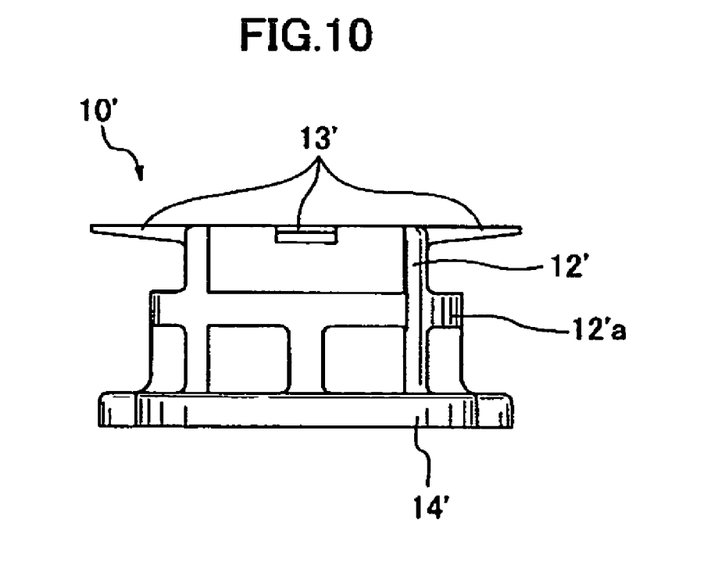
FIG. 10 is a front elevation view of the fastener according to the second embodiment.
Figure 11:
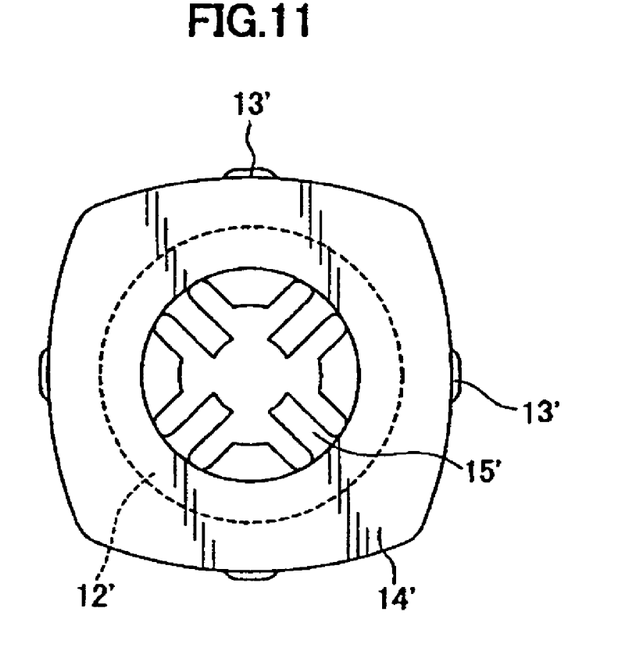
FIG. 11 is a bottom plan view of the fastener according to the second embodiment.
Figure 12:
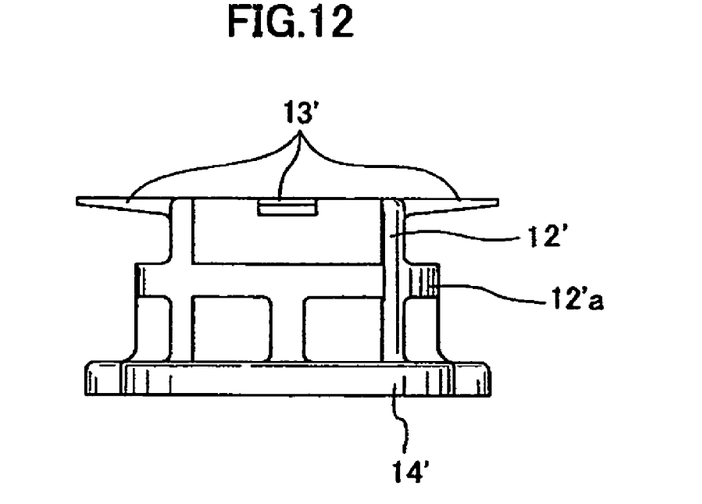
FIG. 12 is a side elevation view of the fastener according to the second embodiment.
Figure 13:
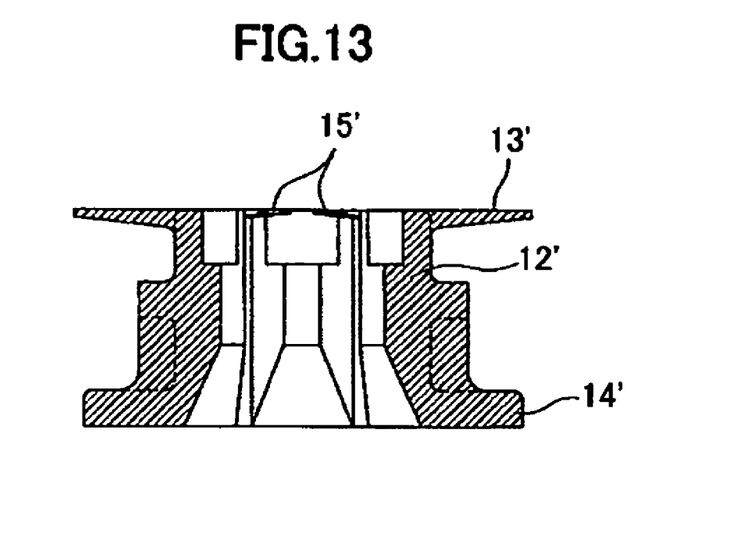
FIG. 13 is a sectional view taken along the line D—D in FIG. 9 showing the fastener according to the second embodiment.
Figure 14:
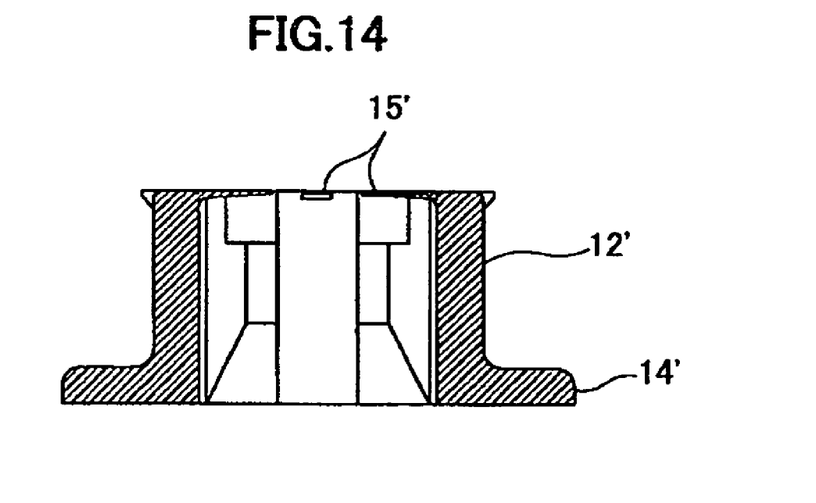
FIG. 14 is a sectional view taken along the line C—C in FIG. 9 showing the fastener according to the second embodiment.

As shown in FIG. 9, the flange 14' has a rounded rectangular shape. The shank 12' has a square shape, and a circular large-diameter portion 12a' is formed on the outer surface of the shank 12'. This shape advantageously prevents the shank 12' from being displaced or rotated relative to the silencer 7.

Figure 15:
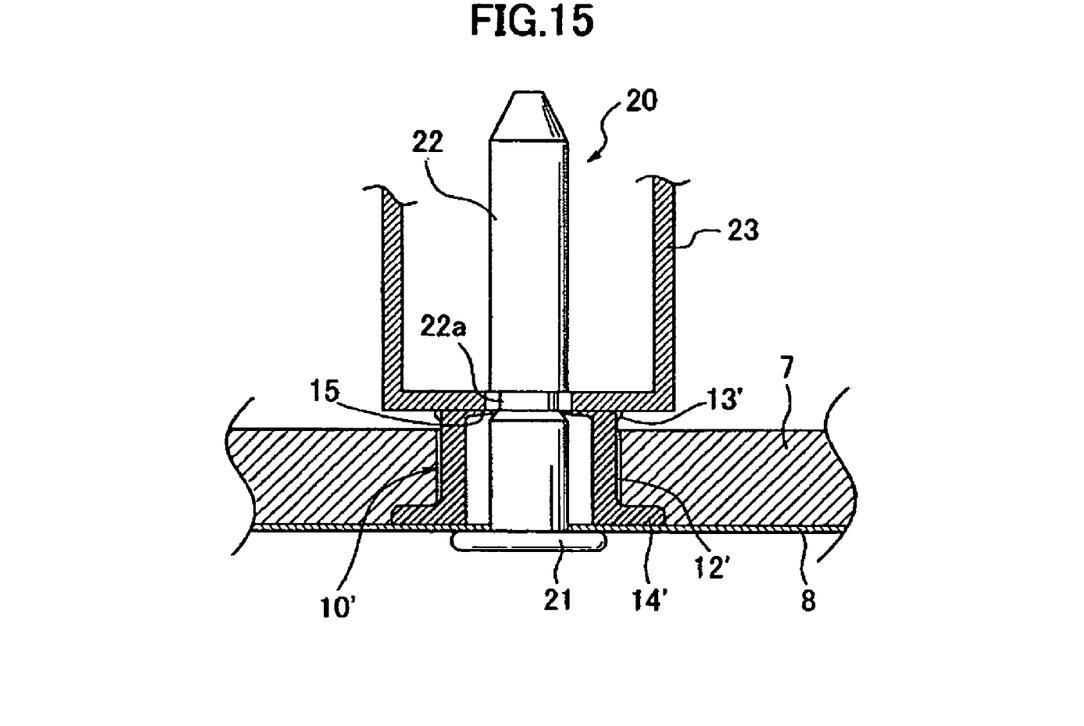
FIG. 15 is a sectional view showing the state after the fastener according to the second embodiment, pre-attached to a sheet-shaped member, is engaged with a stud fixed on a body panel and then an interior panel is mounted to the stud.

FIG. 15 is a sectional view showing the state after the fastener 10', pre-attached to the silencer 7, is engaged with a stud 20 fixed on a body panel 8 or other mounting member and then an interior panel 23 is mounted to the stud 20. The operation of attaching the fastener 10' to the silencer 7 is the same as that in the first embodiment.

In the operation of pushing the fastener 10' toward the stud 20, the stud-engagement pawls 15' are pushed and moved outward by a stem 22 of the stud. Since each of the stud-engagement pawls 15' extends perpendicular to the axis of the shank 12', it has a deformation less than that of the stud-engagement pawls 15 in the first embodiment. After the stud 20 is fully inserted into the fastener, the stud-engagement pawls 15' are engaged with a small-diameter portion 22a of the stud stem 22 in FIG. 15. The fastener 10' according to the second embodiment requires a pushing force greater than that with the fastener 10 according to the first embodiment, and may not be engageable with various studs having different diameters. On the other hand, once the stud-engagement pawls 15' are engaged with the stud 20, the fastener 10' can maintain a reliable engagement without loosening. After the fastener 10' is engaged with the stud, it can be detached by applying a pulling force approximately equal to the pushing force.

Figure 16:
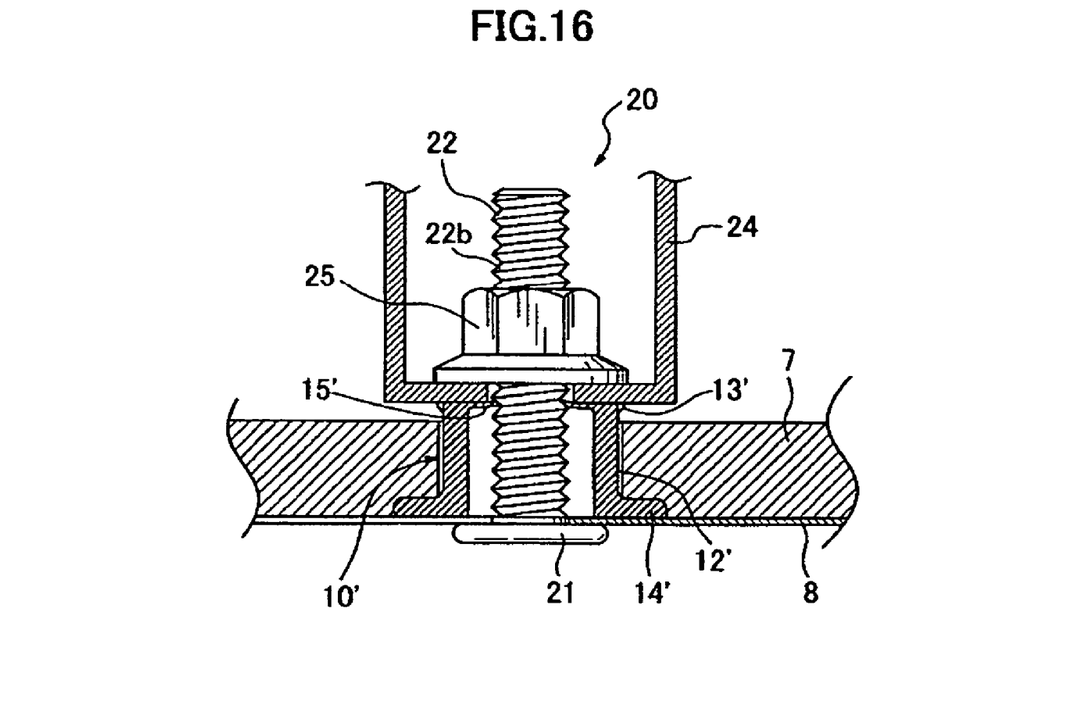
FIG. 16 is a sectional view showing the state after the fastener according to the second embodiment, pre-attached to a sheet-shaped member, is engaged with a stud fixed on a body panel and then an air-conditioner component is mounted to the stud.

The structure in FIG. 16 is similar to that in FIG. 15, but differs therefrom in that a stud stem 22 in FIG. 16 is formed with external threads 22b along its length, instead of a small-diameter portion 22a of the stud stem 22 in FIG. 15. Further, instead of the interior panel 23, an air-conditioner component 24 is fixedly mounted to the stud with a nut 25.

As shown in FIGS. 7, 8, 15, and 16, a fastener of the invention becomes part of an assembly comprising a mounting member having a stud thereon, a sheet-shaped member, the fastener, and an auxiliary member. To attach a sheet-shaped member to a mounting member over a large area of the sheet-shaped member, the mounting member will be provided with a plurality of studs at spaced positions thereon, and the sheet-shaped member will be provided with a corresponding plurality of mounting holes into which a corresponding plurality of fasteners will be inserted. After the fasteners are inserted in the mounting holes, the pre-assembly of the sheet-shaped member and the fasteners can be aligned with the mounting member so that each fastener receives a corresponding stud therethrough. One or more auxiliary members can then be attached to studs projecting from selected fasteners.

While preferred embodiments of the invention have been shown and described, it will be apparent that modifications can be made without departing from the principles and spirit of the invention, the scope of which is defined in the appended claims.

What is claimed is:

1. A fastener adapted to be attached to a sheet-shaped member, so that the sheet-shaped member can be attached to a mounting member via the fastener, the fastener comprising:
    a tubular shank adapted to be inserted into a mounting hole of the sheet-shaped member;
    a plurality of individual holding piece arms, extending radially outward from corresponding partial portions of the periphery of a first end of the shank, and substantially in a same plane as the first end of the shank, the holding piece arms being separated from each other by open spaces in said plane that are substantially greater in width than width of said holding piece arms in said plane;
    a flange extending outward from a second end of the shank, and having an outer cross-dimension greater than an inner cross-dimension of the mounting hole of the sheet-shaped member; and
    at least one stud-engagement pawl extending into the interior of the shank,
    wherein the shank has a length less than that of a stem of a stud fixed to a mounting member with which the fastener is to be engaged, so that the stud stem protrudes from a first surface of the sheet-shaped member after the shank is inserted into the mounting hole, with the holding piece arms leading, until the holding piece arms are adjacent to the first surface and the flange is adjacent to an opposite second surface of the sheet-shaped member, and the stud is passed through the shank and the pawl is engaged with the stud, and wherein protrusion of the stud stem allows an auxiliary member to be mounted thereto.

2. The fastener according to claim 1,
    wherein there are a plurality of the stud-engagement pawls, each extending from a position near the second end of the shank to a position near the first end of the shank and inclined inwardly of the shank.

3. The fastener according to claim 1,
    wherein there are a plurality of the stud-engagement pawls, each extending radially inward from a position substantially at the first end of the shank.

4. The fastener according to claim 1,
    wherein after an auxiliary member is mounted to the stud stem, a wall of the auxiliary member is in contact with the holding piece arms and the first end of the shank to allow the wall of the auxiliary member to be located at a position apart from the mounting member by a given distance.

5. The fastener as defined in claim 1, wherein the holding piece arms have flat surfaces aligned with the first end of the shank.

6. The fastener according to claim 1, wherein there are four evenly spaced holding piece arms.

7. An assembly comprising a mounting member having a stud thereon, a sheet-shaped member, a fastener, and an auxiliary member, wherein:
    the sheet-shaped member has a mounting hole through which the stud extends and protrudes from one side of the sheet-shaped member,
    the fastener has a tubular shank surrounding the stud in the mounting hole, has a flange extending outward from a flange end of the shank adjacent to a second side of the sheet-shaped member adjacent to the mounting member, has at least one pawl extending into the interior of the shank and engaging a groove or thread of the stud, and has an opposite end of the shank, opposite to and remote from the flange end, with a plurality of individual holding piece arms projecting radially outward from the opposite end of the shank substantially in a same plane as the opposite end of the shank, and adjacent to the first side of the sheet-shaped member, the holding piece arms being separated from each other by open spaces in said plane that are substantially greater in width than width of said holding piece arms in said plane, and
    wherein the auxiliary member has a wall with a hole through which the stud projects, the wall being adjacent to the opposite end of the shank.

8. The assembly of claim 7, wherein there are a plurality of pawls extending from near the flange end of the shank toward the opposite end of the shank and inclined inwardly.

9. The assembly of claim 7, wherein there are a plurality of pawls extending radially inward from positions to substantially at the opposite end of the shank.

10. The assembly of claim 7, wherein the stud is threaded and the wall of the auxiliary member is held between the opposite end of the shank and a nut on the stud.

11. The assembly of claim 7, wherein the holding piece arms have flat surfaces aligned with the opposite end of the shank, and the wall of the auxiliary member is adjacent to the flat surfaces of the holding piece arms.

12. The assembly of claim 7, wherein the second side of the sheet-shaped member and the flange are in contact with the mounting member.

13. The assembly according to claim 7, wherein there are four evenly spaced holding piece arms.

* * * * *